Mar. 20, 1923
E. P. HENDRICK
CONVERTIBLE WHEEL FOR VEHICLES
Filed Aug. 9, 1922
1,449,117
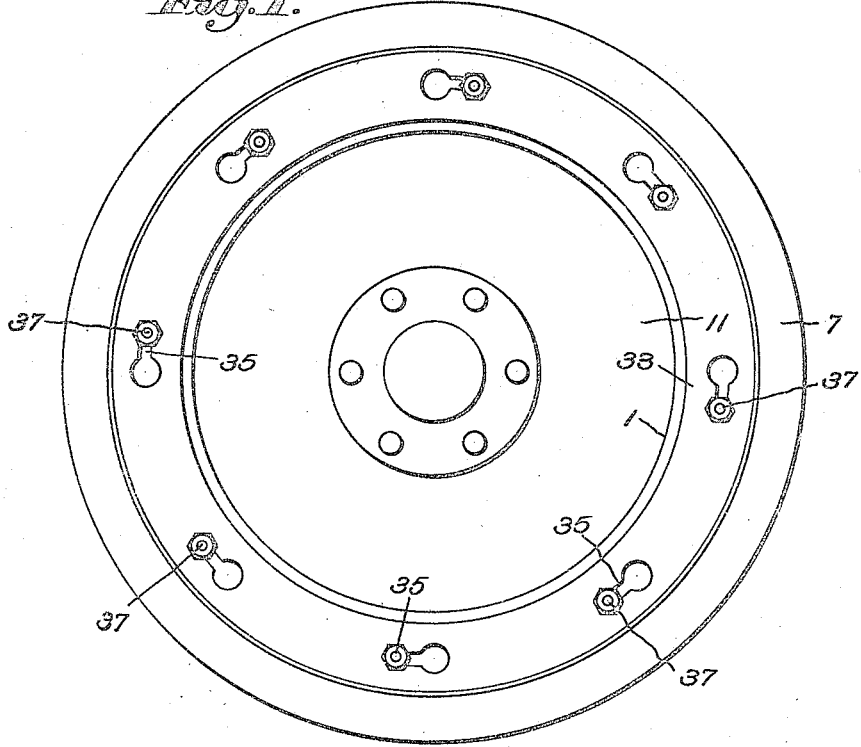
Fig. 1.
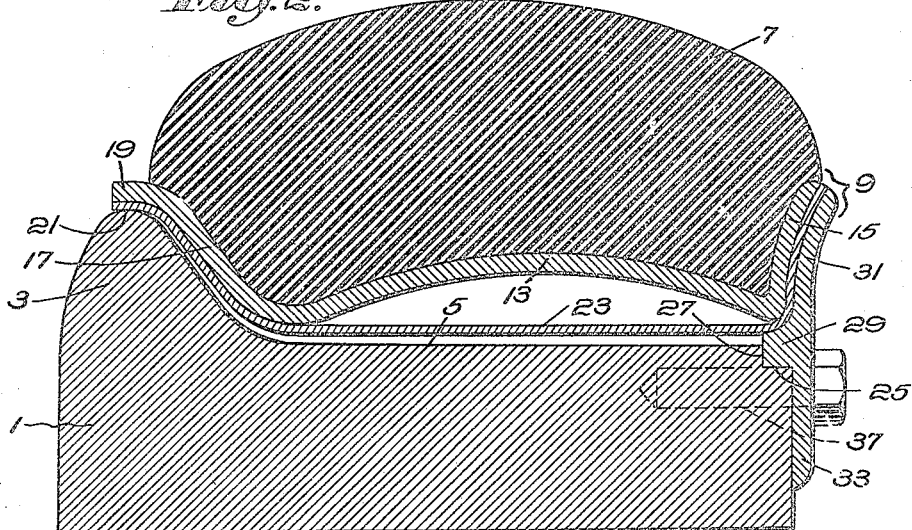
Fig. 2.
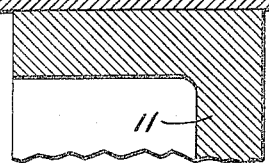
Inventor:
Edward P. Hendrick
by Emery, Booth, Janney & Varney
Attys.

Patented Mar. 20, 1923.

1,449,117

UNITED STATES PATENT OFFICE.

EDWARD P. HENDRICK, OF NEWTONVILLE, MASSACHUSETTS.

CONVERTIBLE WHEEL FOR VEHICLES.

Application filed August 9, 1922. Serial No. 580,703.

*To all whom it may concern:*

Be it known that I, EDWARD P. HENDRICK, a citizen of the United States, and a resident of Newtonville, county of Middlesex, and State of Massachusetts, have invented an Improvement in a Convertible Wheel for Vehicles, of which the following description, in connection with the accompanying drawings, is a specification, like characters on the drawings representing like parts.

My invention relates to vehicle wheels and is particularly concerned with a wheel for adapting motor trucks to run either on railway tracks or on the road.

My invention which has among its objects the provision of a wheel in which conversion from on type to the other is unaffected by wear will, however, be best understood from the following description when read in connection with the accompanying drawings of one form of my invention submitted for illustrative purposes, while the scope of my invention will be more particularly pointed out in the appended claims.

In the drawings:—

Fig. 1 shows a side elevation of the wheel converted for a road service; and

Fig. 2 is a fragmentary section of the rim portion of said wheel.

Referring to the drawings and to the preferred embodiment of my invention, I have shown a wheel having a tire 1 provided with a flange 3 and a tread 5 for adapting the wheel for railway service while surrounding the tire 1 I have shown a road wheel having a rubber tire 7 and a rim which is indicated in its entirety at 9. For convenience of illustration I have indicated the railway tire as supported by the disk 11 to which the tire may be secured in any convenient manner.

In the embodiment of my invention selected for illustration the rim 9 includes an arched portion 13 and at the sides of this portion and integrally formed therewith the flanges 15 and 17, the flange 17 having the terminal portion 19 which extends over and contacts the outer peripheral surface 21 of the flange 3. Connecting the opposite sides of the arched portion 13 is the portion 23 of the rim which portion is made to conform with the flanges 15 and 17, and is secured to the flanges in any convenient manner, as for example, by spot welding.

The tire 1 at the side of the tread is reduced in diameter at 25 to form the shoulder 27. Fitting the portion 25 and abutting the shoulder 27 is the portion 29 of the rim of the road tire, the upper part 31 of the portion 29 being made to conform with that part of the outer surface of the rim portion 23 which conforms to the flange 15. The rim portion 29 is further provided with a flange 33 extending toward the axis of the wheel and contacting the side of the wheel. The outer part 31 of the rim portion 29 is secured to the adjacent portions of the rim in any convenient manner, as for example, by spot welding.

It will be noted that the above described construction of the rim of the road tire makes a light yet rigid construction. As shown, the parts are so shaped that the road tire rim roughly conforms to the tread and adjacent surface of the railway wheel but is out of contact therewith.

For securing the road tire to the railway wheel the flange 33 is provided with slots, through which extend the bolts 37, the latter in an obvious manner when tightened serving to hold the road wheel rigidly in place on the railway wheel.

In some classes of railway service, there is considerable wear on the surface of the flange adjacent the tread but as far as it is known to me it is unusual for the outer peripheral surface to be subjected to material wear. It will, however, be noted by my construction, in which the tire rests on the portion 25 of the railway tire and on the peripheral portion of the flange, that the fit of the road tire on the railway wheel is unaffected by wear. Further, by making the portions of the road tire intermediate those portions which rest on the peripheral surface of the flange and on the reduced diameter 25 of the railway tire of such diameter that they are out of contact with the railway wheel I avoid the difficulties incident to discrepancies in manufacture of the parts.

Although I have described for purposes of illustration one specific embodiment of my invention, it is to be understood that I am not limited thereby to its particular mechanical details but that within the scope of my invention wide deviations may be made therefrom without departing from the spirit of my invention.

Claims.

1. The combination with a railway wheel having a tread and a flange at the side of said tread, of a road tire for converting said wheel for road service, said road tire being adapted to fit over said railway wheel and be secured thereto out of contact with said tread and the surface of said flange adjacent said tread.

2. The combination with a railway wheel having a tread and a flange at the side of said tread, of a road tire for converting said wheel for road service, said road tire being adapted to fit over said railway wheel and be secured thereto out of contact with the wearing surfaces of said flange and tread.

3. The combination with a railway wheel having a tread and a flange at the side of said tread, of a road tire for converting said wheel for road service, said road tire being constructed to fit the peripheral portion of said flange and to be secured to said wheel at the side thereof opposite said flange.

4. The combination with a railway wheel having a tread and a flange at the side of said tread, of a road tire for converting said wheel for road service; said road tire being constructed to fit the peripheral portion of said flange, to be out of contact with said tread and the side of said flange adjacent said tread, and to be secured to said wheel at the side thereof opposite said flange.

5. The combination with a railway wheel having a tread and a flange at the side of said tread, of a road tire for converting said wheel for road service, said railway wheel having a shoulder portion at the side thereof opposite said flange, and said road tire having a portion fitting said shoulder portion and at its opposite side a portion fitting the peripheral surface of said flange.

6. The combination with a railway wheel having a tread and a flange at the side of said tread, of a road tire for converting said wheel for road service, said railway wheel having a shoulder portion at the side thereof opposite said flange, said road tire having a portion fitting said shoulder portion and at its opposite side a portion fitting the peripheral surface of said flange, and the intermediate portion of said road tire being out of contact with said tread and the adjacent portion of said flange.

7. The combination with a railway wheel having a tread and a flange at the side of its tread, of a road tire for converting said wheel for road service, said road tire fitting over said wheel and having a portion adapted to contact the peripheral surface of said flange.

8. The combination with a railway wheel having a tread and a flange at the side of its tread, of a road tire for converting said wheel for road service, said road tire fitting over said railway wheel out of contact with all the wearing surfaces of said railway wheel.

9. The combination with a railway wheel having a tread and a flange at the side of its tread, of a road tire for converting said wheel for road service, said road tire fitting over said railway wheel and contacting said railway wheel only on the peripheral surface of said flange and at the side of said wheel opposite said flange.

10. The combination with a railway wheel having a tread and a flange at the side of said tread, of a road tire for converting said wheel for road service, said road tire having an arched portion over said tread and a connected portion resting on the peripheral portion of said flange.

11. The combination with a railway wheel having a tread and a flange at the side of said tread, of a road tire for converting said wheel for road service, said road tire having an arched portion over said tread and a connected portion resting on the peripheral portion of said flange, and said road tire having a portion connecting the opposite sides of said arched portion.

12. The combination with a railway wheel having a tread and a flange at the side of said tread, of a road tire for converting said wheel for road service, said road tire having an arched portion over said tread and a connected portion resting on said flange.

13. The combination with a railway wheel having a tread and a flange at the side of said tread, of a road tire for converting said wheel for road service, said road tire having an arched portion over said tread and a connected portion resting on said flange, and said road tire having a portion connecting the opposite sides of said arched portion.

14. The combination with a railway wheel having a tread and a flange at the side of said tread, of a road tire for converting said wheel for road service, said road tire having its inner portion roughly conforming to the surfaces of said tread and flange but out of contact with said surfaces, and said road tire resting on the outer portion of said flange and being secured to the side of said wheel.

15. The combination with a railway wheel having a tread and a flange at the side of said tread, of a road tire for converting said wheel for road service, said road tire having an arched portion and a portion connecting opposite sides of said arched portion, the inner portion of said road tire roughly conforming to the surfaces of said tread and flange but being out of contact therewith and being secured to the side of said wheel.

In testimony whereof, I have signed my name to this specification.

EDWARD P. HENDRICK.